United States Patent
Hill et al.

(10) Patent No.: US 9,055,323 B2
(45) Date of Patent: Jun. 9, 2015

(54) TOUCHSCREEN REMOTE WITH AUDIBLE ALERT, VOICE PROMPTING, AND BACKLIGHT ACTIVATION BUTTONS

(76) Inventors: Norma Hill, Fairfield, AL (US);
Paulette Patrick, Uniontown, AL (US);
Ruthie Jones, Newbern, AL (US)

(*) Notice: Subject to any disclaimer, the term of this patent is extended or adjusted under 35 U.S.C. 154(b) by 216 days.

(21) Appl. No.: 13/551,683

(22) Filed: Jul. 18, 2012

(65) Prior Publication Data
US 2013/0021534 A1    Jan. 24, 2013

Related U.S. Application Data

(60) Provisional application No. 61/510,824, filed on Jul. 22, 2011.

(51) Int. Cl.
| | |
|---|---|
| G08B 21/00 | (2006.01) |
| H04N 21/422 | (2011.01) |
| G08B 21/24 | (2006.01) |
| G08C 17/02 | (2006.01) |
| G08C 23/04 | (2006.01) |
| H04N 21/41 | (2011.01) |
| H04N 21/81 | (2011.01) |

(52) U.S. Cl.
CPC .......... *H04N 21/42224* (2013.01); *G08B 21/24* (2013.01); *G08C 17/02* (2013.01); *G08C 23/04* (2013.01); *H04N 21/4126* (2013.01); *H04N 21/42222* (2013.01); *H04N 21/8106* (2013.01); *G08C 2201/30* (2013.01)

(58) Field of Classification Search
CPC ..... G08B 21/24; H04N 5/44582; G08C 23/04
USPC ................. 348/734, E05.096, 539.1, 539.32; 704/E21.001
See application file for complete search history.

(56) References Cited

U.S. PATENT DOCUMENTS

| | | | | |
|---|---|---|---|---|
| 5,410,326 | A | * | 4/1995 | Goldstein ...................... 348/734 |
| 5,650,831 | A | * | 7/1997 | Farwell ......................... 348/734 |
| 6,543,052 | B1 | * | 4/2003 | Ogasawara ..................... 725/60 |
| 6,573,832 | B1 | | 6/2003 | Fugere-Ramirez |
| 7,436,460 | B2 | | 10/2008 | Glazier |
| 2004/0066308 | A1 | * | 4/2004 | Sampsell ................. 340/825.69 |
| 2007/0097274 | A1 | | 5/2007 | Pfiffer |
| 2008/0278635 | A1 | * | 11/2008 | Hardacker et al. ............ 348/734 |
| 2010/0085184 | A1 | | 4/2010 | Cuttino |
| 2011/0140868 | A1 | * | 6/2011 | Hovang ..................... 340/12.55 |

* cited by examiner

*Primary Examiner* — Mark Rushing
(74) *Attorney, Agent, or Firm* — Daniel Boudwin; Global Intellectual Property Agency LLC

(57) ABSTRACT

Disclosed is a touchscreen remote control device and system having means of locating the remote if misplaced, wherein the remote includes an imbedded receiver, television control emitter, a signal generator and a touchscreen interface. A corresponding television or electronic device includes three modes of locating the remote, including an audible tone alert, a voice messaging alert and a means of activating the backlight of the remote touchscreen for low light visualization. The remote is a structure that includes a touchscreen for control purposes and for interfacing with the television, wherein the remote includes rechargeable batteries and a speaker for transmitting the audible locating signal upon request.

7 Claims, 4 Drawing Sheets

TOUCHSCREEN REMOTE WITH AUDIBLE ALERT, VOICE PROMPTING, AND BACKLIGHT ACTIVATION BUTTONS

CROSS REFERENCE TO RELATED APPLICATION

This application claims the benefit of U.S. Provisional Application No. 61/510,824 filed on Jul. 22, 2011, entitled "3-in-1 Touch Screen System." The patent application identified above is incorporated here by reference in its entirety to provide continuity of disclosure.

BACKGROUND OF THE INVENTION

1. Field of the Invention

The present invention relates to improved remote control interfaces and means of locating misplaced remote controls for electronic equipment. More specifically, the present invention pertains to a multifunction remote control device having a touchscreen interface and three mode locating means.

It is well known that remote controls are frequently misplaced or lost within a household, as many users tend to use the remote and place it in different locations within a room or even within an entire household when moving from room to room. Such devices are convenience articles that allow remote access and control over a television or similar electronic accessory while seated and positioned a given distance away. Misplacing such articles, while common, is a very frustrating occurrence that can lead to reduced television functionality and user control thereover, as most modern televisions include sophisticated menus and features and minimal physical interfaces for control thereof. To find lost and misplaced remote controls, it is sometimes required to inspect seat cushions and search the household, which is both time consuming and inefficient. Furthermore, lost remotes that go unrecovered create an issue of finding a suitable replacement, wherein generic remote controls may lack the appropriate interface or suitable means of communicating with all of the television features that are inherent in the original remote. The present invention is therefore submitted as an improved device and system of locating and recovering such an article after being misplaced, wherein the accompanying television or television accessory includes three modes of interacting with the remote and initiating a locating signal therefrom.

Aside from misplaced remotes and means for locating remote control devices, it is also recognized that modern televisions include a broader set of functions and capabilities, including user interaction capabilities and means of interfacing with other electronic media. This is compared to televisions of the recent past, wherein modern digital cable transceivers and networks now allow for channel surfing using a guide interface and the televisions themselves include means of interfacing with the internet. Digital cable television allows televised programs to be searchable, purchasable and even recordable for later viewing. Digital interfaces on the televisions themselves now commonly allow direction connection to the internet and an interface for accessing web sites, internet applications and other network capabilities. Given this increased capability, it is submitted that generic cable and television remotes have not kept pace with these advances, wherein most remotes do not readily allow satisfactory navigation and interfacing with these capabilities. Means of input on generic remotes lacks efficiency and appropriateness, wherein the means of input is restricted to an array of static push buttons that limit the user's ability to swiftly input text, navigate between programs or make on-screen selections.

The present invention is submitted as an improved remote control device having a touchscreen interface that can be programmed for a specific television or television accessory and further bed used as an improved means of interfacing with modern internet-ready televisions and digital cable boxes. The touchscreen is not limited by physical buttons, and can be programmed for a specific television to match its capabilities and allow efficient interaction therewith. This provides an improved means of interfacing with the television internet applications, services and the digital cable controls. The device further can be programmed to operate television accessories, including audio systems and media readers. Finally, the device includes an imbedded means of determining the remote control location if misplaced. A three-mode interaction is disclosed, wherein a complimentary television or electronic device includes three buttons to activate signal in the form of: 1) a ringtone or audible tone, 2) a voice interface, and 3) backlight/glow activation. These three means allow the user to audibly and visually locate a missing remote within a defined distance from the transmitting television.

2. Description of the Prior Art

Devices have been disclosed in the prior art that relate to remote controls and means of locating missing articles. These include devices that have been patented and published in patent application publications, and generally relate to remotes having imbedded means of creating an audible or vibratory signal for locating purposes. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,573,832 to Fugere-Ramirez discloses a remote control finder for locating personal items such as keys, remote controls, and phones. The finder sends a radio signal to one of a plurality of receivers that emits an audible beeping noise upon activation. The receiver attaches via a sticker to the personal item and is numbered so a specific receiver may be activated for finding a given item. The receiver is a disk-shaped housing having a speaker and a radio frequency receiver, while the transmitter unit comprises a housing, a plurality of receiver push buttons and a means of sending an outgoing radio transmission to a specific receiver. The Fugere-Ramirez device, while disclosing general item locator and transmitting unit, does not disclose an integrated television remote finding system and advanced remote control interface.

U.S. Published Patent Application Publication No. 2007/0097274 to Pfiffer is another such device that discloses a television system that includes a wireless transmitter within the television set and a wireless receiver in the remote control. The television set includes a means of activating an outgoing signal to the remote control for the control to create a sound, emit light and vibrate for location purposes. The device of Pfiffer does not contemplate the elements of the remote itself, which include an interface for interfacing with a television and further for controlling the remote control locating means. The present invention discloses three functions that are individually activated for locating a remote within a household, including voice prompting, sound alerts and screen backlight activation.

Further, U.S. Published Patent Application Publication No. 2010/0085184 to Cuttino discloses an electronic finder system for locating misplaced remote control devices, wherein the system includes a remote control having an audio signal device for emitting sound, a visual signal device to emit light and a vibration signal device for producing mechanical vibration. The remote control device includes a means of selectively rendering the signal device operative and non-operative, wherein an alarm actuator on the associated electronic equipment activates the remote to reveal its whereabouts. Similar to the Pfiffer device, the Cuttino device fails to contemplate or disclose the novel features of the present touchscreen remote device.

Finally, U.S. Pat. No. 7,436,460 to Glazier discloses an easy-to-find remote control device for a television, wherein the television includes an activator that activates a locator signal generator on the remote. The signal generator includes a beeper and or flashing light so the remote can be easily found if misplaced. The remote is capable of operating in three modes: sound only, flashing light only, or both sound and flashing light simultaneously. The remote of Glazier similarly does not disclose the novel features of the present invention interface, or further the ability of the remote to transfer voice prompts from the electronic device to the remote as a means of location activation.

Therefore, the present invention is disclosed for providing a three-mode remote recovery system and a new touchscreen remote control that is adaptable for use with multiple television and accessory interfaces. The device allows a misplaced remote to be easily found, while further providing a more efficient means of interaction with a third-party device. The intent and spirit of the present invention substantially diverge in design elements from the prior art. Consequently it is clear that there is a clear need in the art for an improvement to existing remote control devices. In this regard the instant invention substantially fulfills these needs.

SUMMARY OF THE INVENTION

In view of the foregoing disadvantages inherent in the known types of remote control devices now present in the prior art, the present invention provides a new remote control device and three-mode locating system, wherein the same can be utilized for providing convenience for the user when interfacing with a television and further locating a misplaced remote control.

It is therefore an object of the present invention to provide a new and improved remote control device that has all of the advantages of the prior art and none of the disadvantages.

It is another object of the present invention to provide a remote recovery system that includes three modes of recovery: ringing or audible tone alerts, voice prompting and backlight initiation alert for low light conditions. The three modes are preferably engagable from an interface on the television or complimentary electronic device, wherein one of the three modes is engaged for determining the remote location within the household.

Another object of the present invention is to provide a remote control having a touchscreen interface, wherein the touchscreen provides a readily modifiable interface and one that provides a more efficient means of interaction with internet-ready televisions, digital cable boxes and television accessories.

Yet another object of the present invention is to provide a rechargeable remote control device having a signal receiver, speaker assembly, touchscreen interface, alert volume buttons, a television infrared emitter and a recharging port.

A final object of the present invention is to provide touchscreen device that is water resistant and readily adaptable for use as a generic remote for television accessories, wherein specific accessory control may be loaded onto the remote for controlling all features of the accessory.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
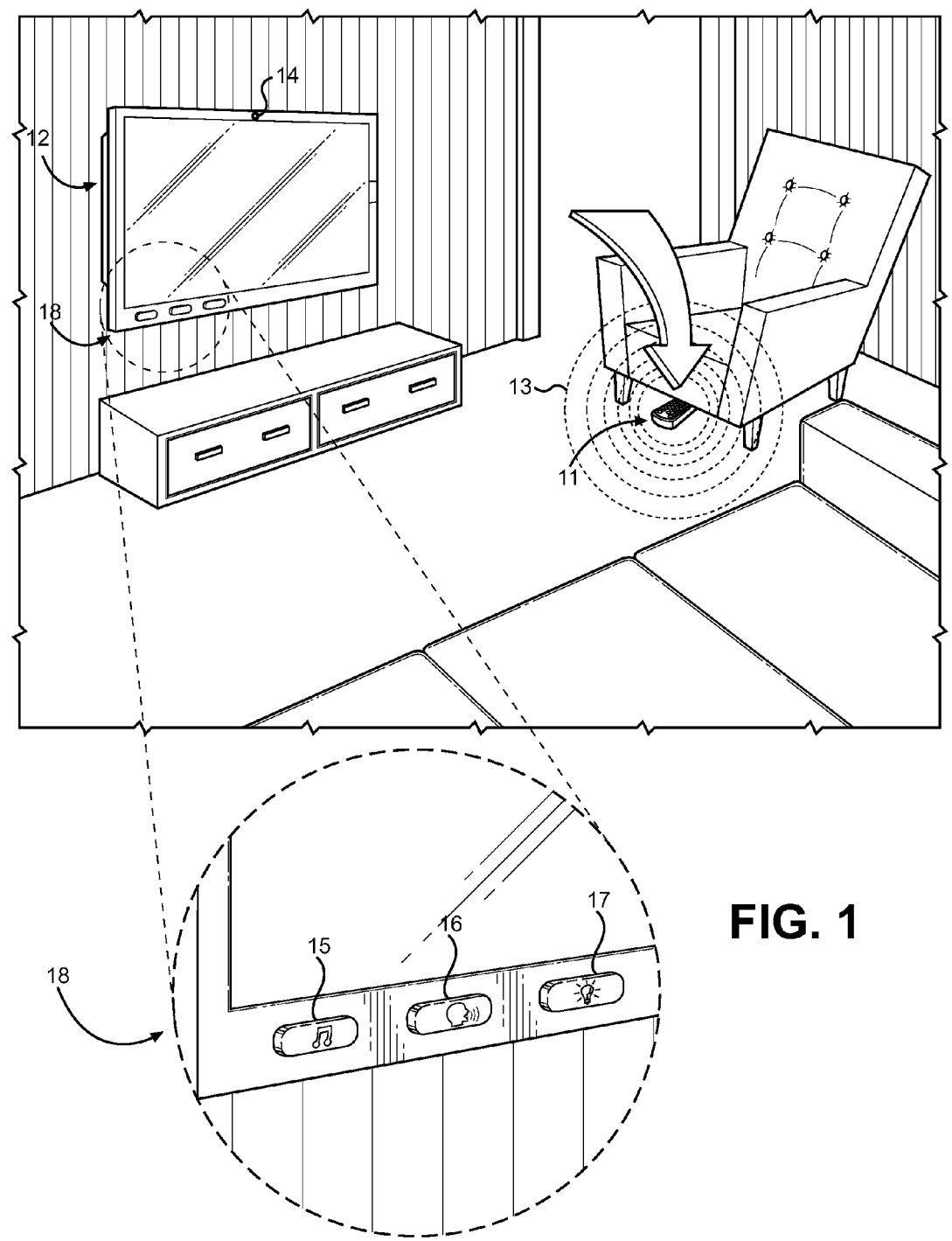
FIG. 1 shows a pictorial view of the present remote control locating system in operation, wherein the three-mode locating means interface is highlighted on the television frame.

Reference is made herein to the attached drawings. Like reference numerals are used throughout the drawings to depict like or similar elements of the remote control device and three-mode recovery system. For the purposes of presenting a brief and clear description of the present invention, the preferred embodiment will be discussed as used for interacting with a television through a touchscreen interface and locating a misplaced remote using one of three locating modes. The figures are intended for representative purposes only and should not be considered to be limiting in any respect.

Figure 2:
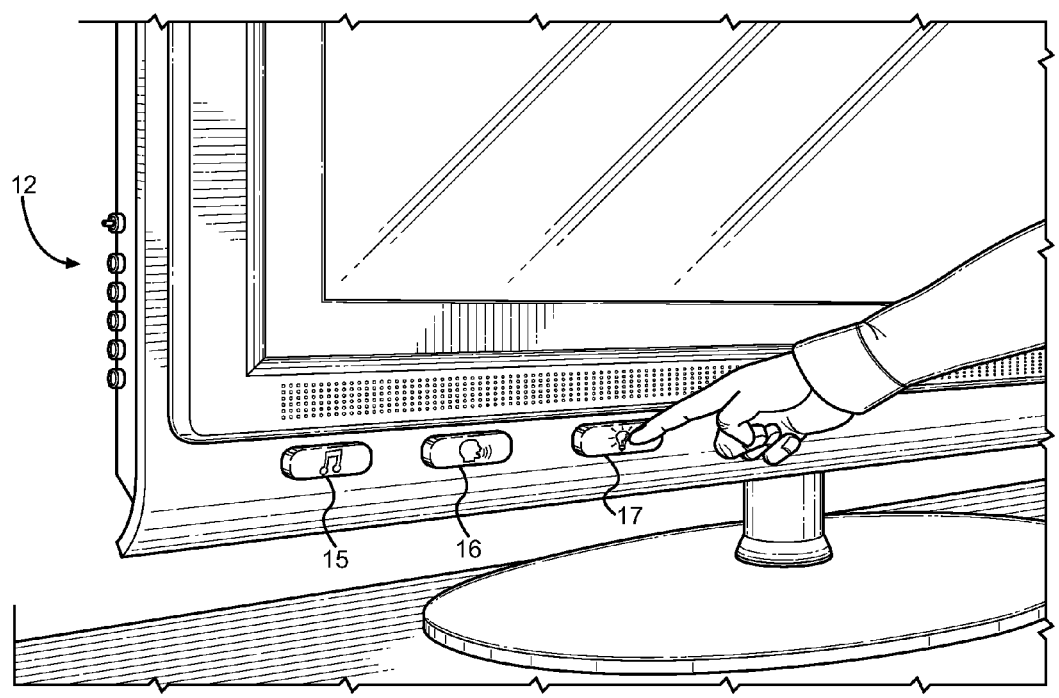
FIG. 2 shows a view of a specific signal being chosen by a user on the locating means interface along a television.

Referring now to FIGS. 1 and 2, there are shown pictorial views of the remote control locating system of present invention in a working position. The locating system of the present invention involves a three-mode locating means, wherein the remote 11 responds to an outgoing radio signal from a television 12 or similar electronic device and emits a signal 13 corresponding to that signal type chosen by the user. It is preferred that the electronic device 12 include a three-button interface 18 for the user to choose the outgoing signal and the desired alert 13, which then allows the remote 11 to be more easily found if misplaced. The interface 18 for initiating the recovery alert 13 include a ringtone or audible tone alert button 15, a voice prompting button 16 and a glow activation button 17. Each of the buttons initiate an outgoing radio signal to the remote 11 within a defined range, wherein the remote control includes a receiver for accepting the outgoing signal and reacting according to user's desired recovery alert 13. The ringtone button 15 sends a radio signal to the remote control that starts an audible tone, melody or song that the user chooses during setup of the system. This allows the user to listen for the device as a means of recovery. The voice prompt button 16 activates a microphone adjacent to the interface 18 for allowing the user to speak thereinto and hear his or her voice through the remote control 11, either delayed or in real-time. This may be desired if the ringtone or audible signal is not strong enough or is otherwise not audible, and the user's voice may be desired. Finally, the glow button 17 initiates the remote control 11 display backlight, which allows the remote to be visualized in low light conditions.

This option may be desirable during later periods, wherein ringtones and audible alerts may be too loud or disturbing to others in the household.

The locating system of the present invention is one that be integrated into a number of various electronic devices having remote controls for operation. The system comprises a television or similar electronic device having a built-in transmitter, a remote locater interface and the remote control of the present invention having an imbedded receiver. The remote includes volume control settings for setting the alert volume, while the outgoing signal for the chosen alert is placed on the television interface and initiated therefrom. When a remote control is missing for a particular electronic device, one of the three locating alerts may be chosen by the user for activating the desired alert, facilitating swift recovery of the remote control and eliminating the occurrence of lost remote device and the need for a generic replacement. The alert interface is one that is built into the television or alternatively attachable thereto, wherein the interface includes the three alert buttons, a microphone for voice prompting, a wireless transmitter, and finally a means of accepting power. After the alert has been activated, the remote control can be found and the alert may be deactivated. Deactivation may be accomplished by accessing the touchscreen and depressing the alert button being enabled, by depressing one of the three-button interface buttons on the electronic device, or alternatively by depression of the volume buttons along the side of the remote. The deactivation may be programmed in such a manner that allows convenience for the user when deactivating the remote signal upon finding the misplaced remote.

Figure 3:
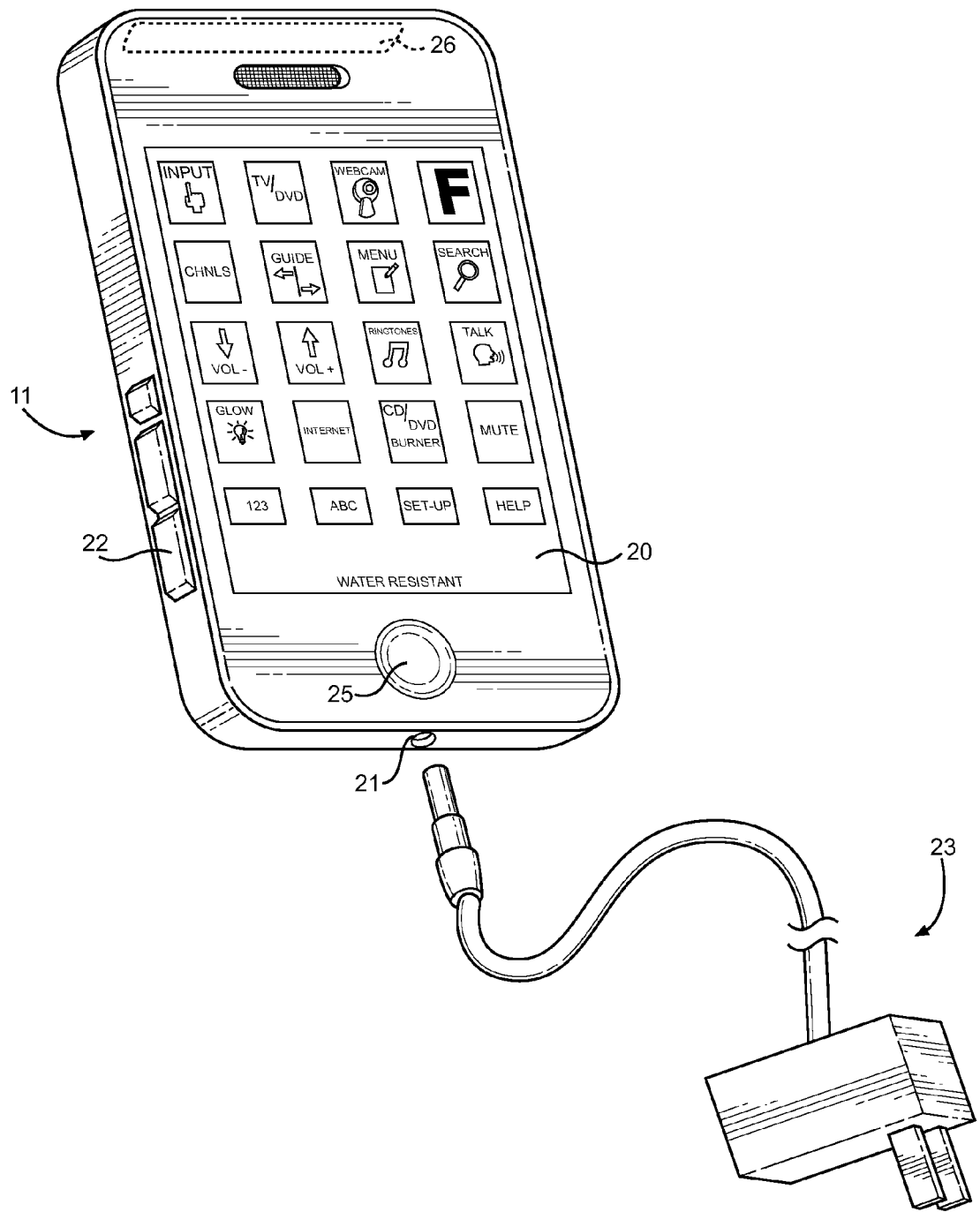
FIG. 3 shows a perspective view of an embodiment of the present remote control and its touchscreen interface.

Referring now to FIG. 3, there is shown a perspective view of the remote control device of the present invention, wherein the structure of the remote 11 and its touchscreen interface 20 is shown. The interface includes a series of adaptable menu options that are programmable for a given television, accessory or electronic device requiring remote control. Specific modules and programs for those electronic devices may be uploaded onto the device after purchase or may be preloaded onto the remote. Access to a wireless network allows the device to receiving information updates and specific controls for a given electronic device, for instance a particular internet-ready television or audio system. The standard controls on the interface for an internet ready television include an input selection, channel and guide selection, television volume controls, location alert controls, and text and number input pad interfaces. Input selection allows the user to switch between television inputs, such as an external media player or connected computer. The channel, guide and search selections are standard digital cable box controls for browsing, surfing and recording programs. An on screen directional pad may further be included, or alternatively a physical direction curser 25 may be positioned below the interface 20 for making directional inputs while searching through the television/cable options.

Location alert controls include setting the options for the three search alert modes, including the ring tone alert, voice prompt alert and the glow alert. Options such as choosing the desired ringtone and setting the duration of the tone or backlight glow are programmable. The text input buttons include a number pad and a QWERTY keypad that are accessible through the touchscreen interface 20. These allow the user to swiftly input text when web browsing or utilizing the web features of a web-ready television. Further options on the interface include the ability to initiate a webcam or similar electronic accessory, access a specific application through the television such as a social media website or search website, while finally the interface is scrollable to allow a plurality of selections to be established on multiple, scrollable screens. This final option allows a plurality of accessory-specific features to be loaded onto the remote for improved control of multiple electronic devices, or further for direct application links to be established on the remote for single-button access to websites, programs or features on the electronic devices.

The touchscreen is adapted to provide an interface that is updatable and evolvable with upgrades to the user's electronic devices, wherein accessory-specific programs may be loaded onto the remote for direct control thereof without resorting to multiple remotes, while still retaining the core control over an internet-ready television. The structure of the remote control is one having a water resistant touchscreen interface, volume control buttons for controlling the remote alert volume, a speaker for emitting the alert signal, a television infrared emitter 26, and a charging port 21 for accepting outlet power through a wall module 23. Within the remote housing is a signal receiver for receiving the alert signal, battery power for independent operation and a backlight for viewing the touchscreen in low light conditions. A wireless internet connection between the remote and a wireless network may further be provided for updating the remote software and adding on future programs and device-specific control software.

Figure 4:
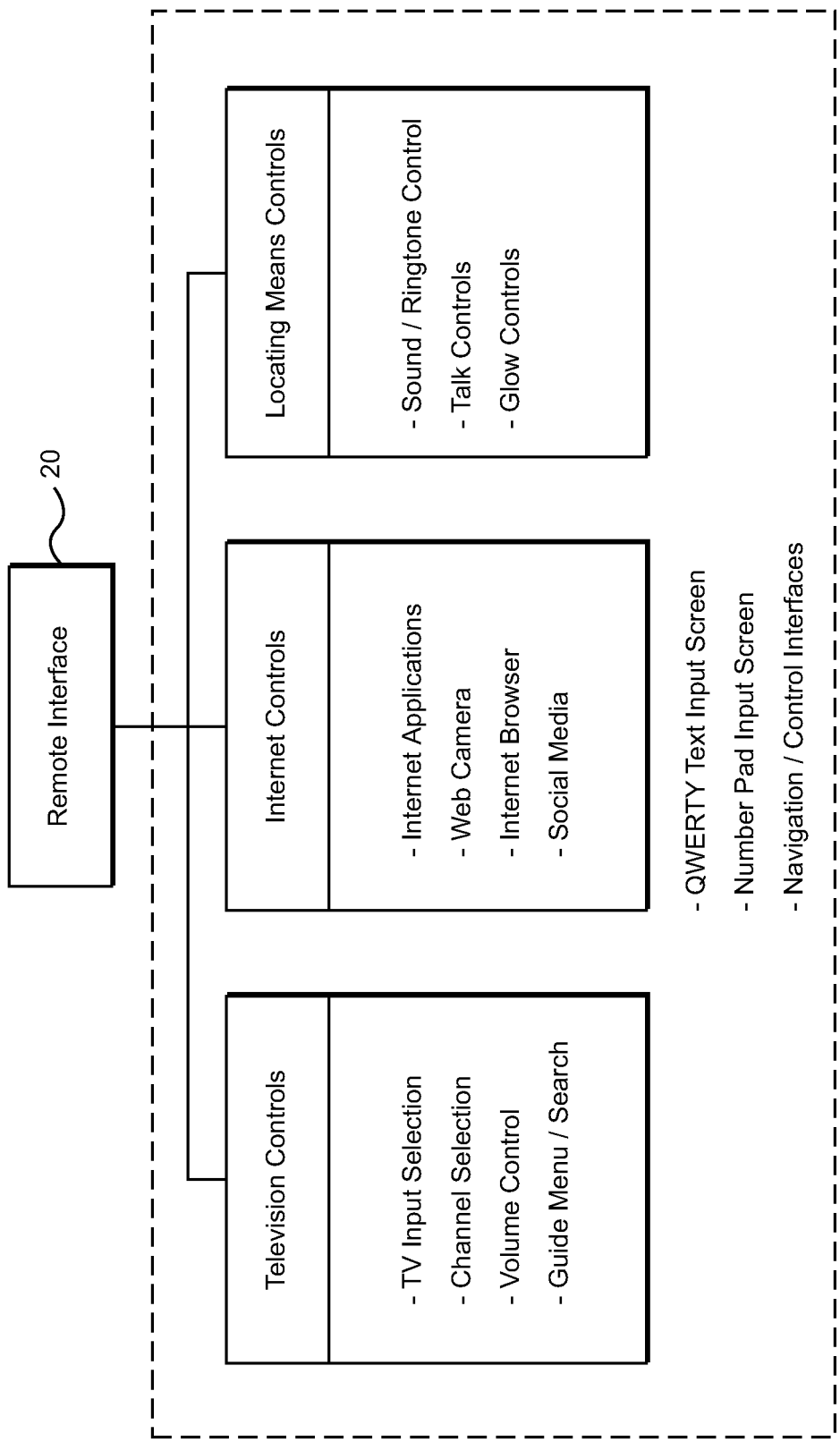
FIG. 4 shows a flow diagram of an embodiment of the remote control interface features.

Referring now to FIG. 4, there is shown a schematic diagram of the remote interface and an embodiment of its programmable options. The remote includes touchscreen control and an interface 20 for controlling three primary components: the television or similar electronic device control, internet browsing and content control, and finally the remote location means control. If utilized with television having digital content, the options include television input selection, channel selection. volume controls and guide/menu searching. For internet connectivity, the device includes access to a web browser, internet applications and social media access, and finally control over web interfacing items such as a web cam controller. The locating means controls include establishing a desired audible alert, voice prompt controls and glow controls. The intensity (volume/brightness) and duration of the alert are adjustable in this interface. Across all applications, components and menus, an accessible text and number pad input screen is deployable. A navigation input, such as a "BACK" button or further directional pad input may be supplied on the remote for increased control. If no external directional input is desired, a direction pad input screen is available on the touchscreen itself, deployed in a similar fashion as the text input pads.

The present invention is an improvement to existing remote devices, wherein the means of input, flexibility of use and means of locating the remote establish a smarter remote control that my operate across electronic device platforms. It is preferred that the remote be established with at least one associated electronic device having the three-mode alert initiation, wherein the device is further an internet-ready television. Several electronic devices may be associated with the present remote, which can load device-specific controls for improved interaction and interoperability between devices without operating several device-specific remotes. If the remote is lost during the course of its deployment, the alert locating means of the device is capable of rapidly directing the user to the location of the device, preventing extending searches therefore and the need for a replacement.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A touchscreen remote and locating system, comprising:
   a remote control having a touchscreen interface, a signal receiver, a speaker, a remote control emitter, battery power, and a charging port;
   an electronic device for receiving a signal from said remote control emitter, said electronic device having a signal transmitter to communicate with said signal receiver of said remote control, an outgoing signal interface to control said signal transmitter, and a microphone;
   said outgoing signal interface comprising an audible tone alert button, a voice prompt button, and a glow button;
   said audible tone alert button initiating said speaker of said remote control to emit a sound alert;
   said voice prompt button initiating said microphone to accept and transfer a voice prompt alert to said speaker of said remote control;
   wherein said voice prompt alert is generated by a user's voice;
   said glow button initiating a touchscreen backlight to provide a glow alert for low light visualization;
   said touchscreen interface including controls for said electronic device and for controlling options for said sound alert, said voice prompt alert, and said glow alert; and
   said touchscreen interface being customizable and updatable for electronic device-specific controls.

2. The device of claim 1, wherein said touchscreen interface further comprises internet-ready television controls for accessing an online network, online applications, and further for operating a television and a digital cable box.

3. The device of claim 1, wherein said touchscreen interface further comprises keypad and number pad input interfaces and a direction pad input.

4. The device of claim 1, wherein said remote control emitter further comprises an infrared emitter.

5. The device of claim 1, wherein said remote control further comprises alert volume control buttons.

6. The device of claim 1, wherein said remote control further comprises direction pad control interface.

7. The device of claim 1, wherein said remote control further comprises a wireless internet connection for updating and loading software.

* * * * *